United States Patent [19]

Enger

[11] 3,963,677

[45] June 15, 1976

[54] IMPERMEABLE SILICONE COMPOSITION

[76] Inventor: Carl C. Enger, 12700 Lake Ave., Lakewood, Ohio 44107

[22] Filed: Nov. 21, 1974

[21] Appl. No.: 525,925

[52] U.S. Cl. ................... 260/28.5 D; 260/28 R; 260/37 SB; 260/42.27; 260/827
[51] Int. Cl.² .......................................... C08L 91/00
[58] Field of Search ................ 260/28, 28.5 D, 827

[56] References Cited
UNITED STATES PATENTS

| | | | |
|---|---|---|---|
| 2,927,908 | 3/1960 | Konkle et al. | 260/827 X |
| 3,069,378 | 12/1962 | Prober | 260/827 X |
| 3,449,290 | 6/1969 | Foster | 260/827 X |
| 3,838,089 | 9/1974 | Pepe | 260/28 X |

*Primary Examiner*—Lewis T. Jacobs

[57] ABSTRACT

A fluid and ion impermeable, durable, and substantially inert plastic composition containing at least about 50% by weight silicone and the remainder of a fluorocarbon and a wax. The fluorocarbon may be chemically combined or suspended as particles in the silicone, and the pores in the product are filled at least partially with a melted wax such as a natural wax like beeswax or a mineral wax as a micro-crystaline wax or even a synthetic wax as polyethylene. This composition or product is polymerized and/or vulcanized in a mold or the shape in which it is to be used with the aid of a catalyst and/or heat. The product also may contain inert fillers such as diatomaceous earth, silica and/or residues of the catalysts used in its vulcanization or final polymerization.

Because of its impermeability to fluids and the transport of ions this product is used for encapsulating or potting of electrical and electronic apparatus imbedded in moisture containing and/or chemically active environments, such as the body, the ground or earth, and the like.

28 Claims, 2 Drawing Figures

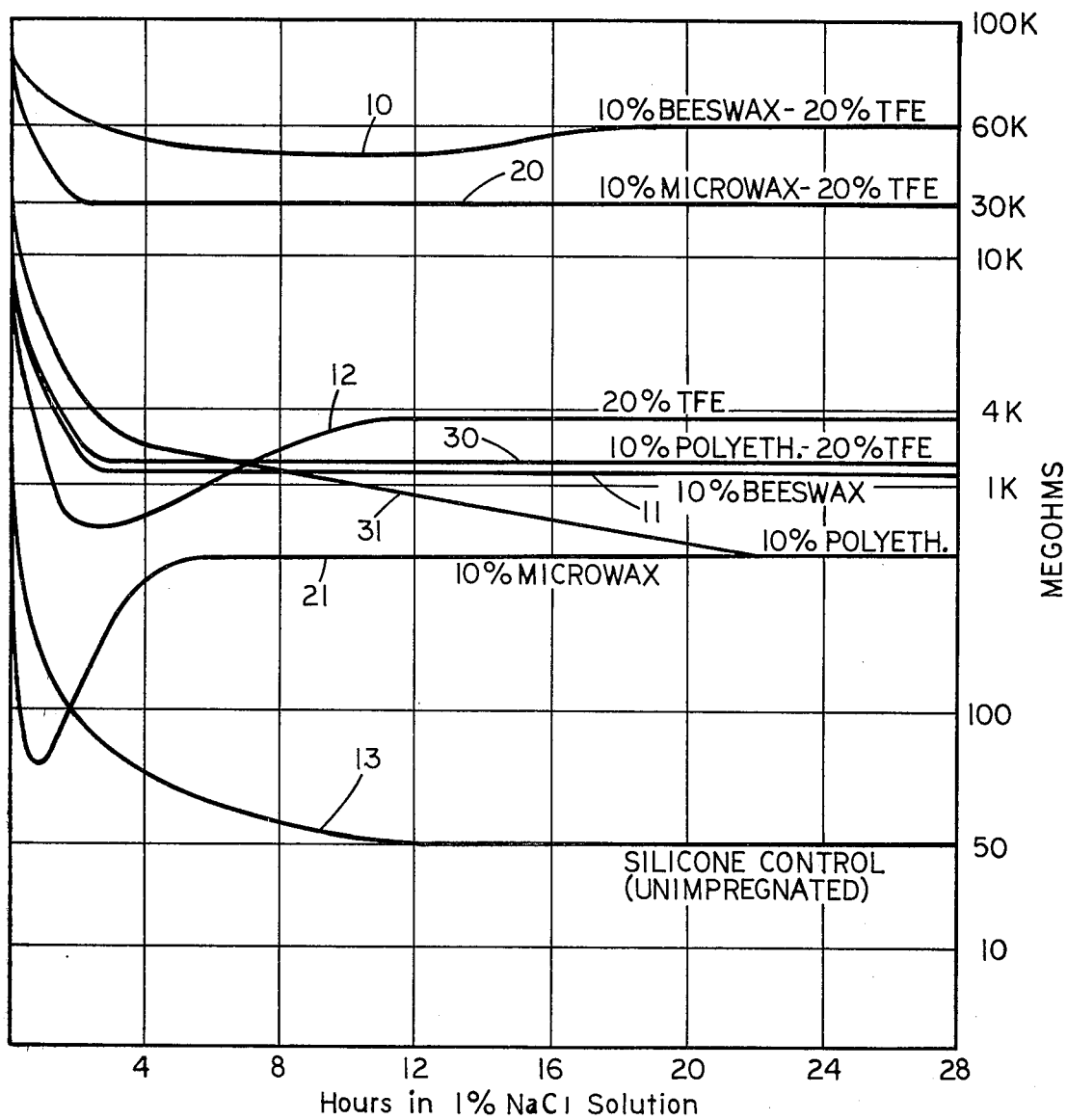
FIG. I
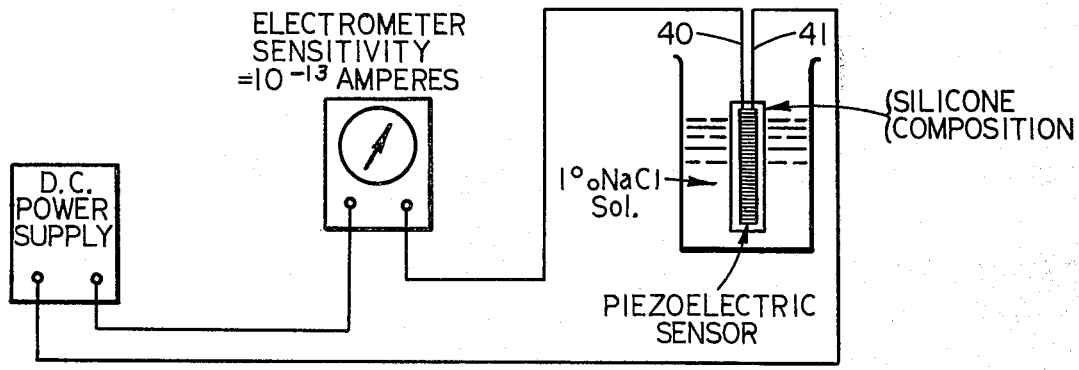
FIG. II

IMPERMEABLE SILICONE COMPOSITION

BACKGROUND OF THE INVENTION

This invention is an improvement in the composition of the membrane disclosed in applicant's U.S. Pat. No. 3,659,615 issued May 2, 1972, comprising a silicone and a wax as an encapsulation composition for an electronic heart pacer.

It is well known that silicones including silicone rubber are non-reactive to the fluids of the body, repell water, and have endurance at high and low temperatures, however, they have been found to be permeable to electrolytes and their ions which are detrimental to the electronic components in which the silicone is the encapsulating material. Also temperature vulcanized silicones for encapsulating electronic components in situ often cannot be used because to heat vulcanize or polymerize such silicones would be detrimental to the electronic components encapsulated by them. On the other hand, room temperature vulcanized silicones exhibit greater water vapor penetration, are soft, have poor abrasive resistance, and are generally weaker than heat vulcanized silicones. Thus the permeability of these silicone compositions is materially reduced by the incorporation therein of a wax to fill their pores, and particularly beeswax. However this wax did not strengthen or toughen the composition any. Therefore, in order to improve their resistance to chemical decomposition, polytetrafluoroethylene was added to these silicone compositions, since it was well known that polytetrafluoroethylene increases the chemical resistance and strength of silicones.

SUMMARY OF THE INVENTION

I THE COMPOSITION

Unexpectedly, the addition of polytetrafluoroethylene or other fluorocarbons to a silicone and wax composition to increase its toughness, also improved the impermeability of the composition by a factor of many times. This was further unexpected in view of the fact that compositions of silicone to which only a fluorocarbon or polytetrafluoroethylene had been added, often increased permeability.

Accordingly this invention comprises a new and unexpected highly impermeable silicone composition comprising both a fluorocarbon and a wax.

I - A. SILICONES

Silicone or polysiloxane comprises at least 50% by weight of the composition of this invention, and can comprise up to 94 or 95% of the weight of the composition, but usually comprises 60 to 85%, and preferably about 70%, by weight of the composition. This silicone is usually a polydimethyl silicone type which is generally the best medical grade silicone for implants in the body, however other silicones with a low number of carbon atoms in their side chains for other uses also may be employed. This silicone also is non-reactive to fluids in the body, however, it is highly permeable to electrolytes and operates like an osmotic membrane. The final product is a solid which may be flexible like a rubber, however in producing this composition the silicone is preferably in its liquid state so that the other ingredients may be easily mixed therein, or else it is dissolved in an organic solvent such as toluene or acetone, which solvent is later evaporated off. If room temperature vulcanization or polymerization is employed, then a catalyst is used such as stannous octoate which forms a peroxide to cross-link the chain polymer molecule of the silicone into a more rigid solid, and the remaining stannous oxide acts as an inert filler in the final composition. If a catalyst is used during heat vulcanization, the catalyst is usually dichlorobenzoyl peroxide which in forming the peroxide to produce the cross-linking, is later evaporated from the composition during the heating.

The silicone rubber also may include an inert filler such as fine particles of diatomaceous earth or silica, which particles are micron in size, preferably as small as 0.3 microns but usually around one micron and may be as large as even 50 microns, but preferably mostly below 20 microns. The limit of the amount of filler is determined by the ability to still polymerize or vulcanize the product. Generally the fillers however are only tolerable in minor percentages, i.e. below about 20% by weight of the first composition.

In addition, the composition may even contain animal repellent additives, if it is to be used for coating or surrounding electric cables that are placed in the ground, so as to prevent animals from attacking the cables.

I - B. FLUOROCARBONS

The fluorocarbon, such as tetra or tri-fluoro-alkyl polymer such as polytri-fluoropropylmethyl polymer and tetrafluoroethylene powder, which is the unexpectedly important ingredient of this invention, can also be considered to be an inert filler and is usually mixed in with the liquid silicone before it is vulcanized as a powder. This powder has a particle size from about 0.5 up to about 50 microns, and can range in percentages between 1 and 40% by weight of the total composition, but usually between about 5 and 35% and preferably between 10% to 30% or within about 5% either side of 20% by weight of the final composition. Thus between about 15 and 25% by weight is the practical maximum that can be tolerated in this silicone composition without its losing too many of the advantages of the silicone therein, and still improve the final composition to have as high a chemical resistance, toughness, and durability as possible. This fluorocarbon, however, may also be polymerized with the silicone as one polymerized ingredient which then would be at least about 55% by weight of the final composition. Fluorocarbons have to high a melting temperature to be melted and mixed with the wax, and thus they are pre-mixed with the silicone before mixing with the wax.

I - C. WAXES

The ingredient which insures the impermeability of the final product to fluids and also to ion transport comprises a wax that can be easily melted and mixed with the silicone and fluorocarbon polymers. This wax makes the composition more non-wettable and increases its surface tension or energy by increasing the contact angle of liquids to the final product. This wax may comprise a natural animal wax such as beeswax or a natural mineral wax such as micro-crystalline paraffin wax, or it may even comprise a synthetic wax such as polyethylene. However, some synthetic waxes are more difficult to add to the silicones and fluorocarbons. Other natural waxes including plant waxes produce improvements, however, they have not been known to be as advantageous as the two just mentioned. For example spermaceti wax, although being very impermeable to fluids, partially sweats out of the composition, and carnauba wax is brittle.

The amount of waxes which may be added vary between a fraction of one percent up to about 25% by weight, however usually at least one or two percent and a maximum of 15% of waxes by weight of the final composition are employed, and preferably around 10% by weight. The wax ingredient however may comprise a mixture of the above mentioned waxes.

II - PROCESS OF MANUFACTURE

There are several different ways in which the composition may be produced depending upon its final use and the properties of each of the ingredients. For example, if the silicone to be used is a liquid or a syrup, the pulverized polytetrafluoroethylene solid particles are suspended in this liquid, and then this suspension is heated to slightly above, that is about 5°C above, the melting point of the wax ingredient and the wax mixed therin as a liquid. It is very important that the mixture be very thoroughly mixed to the point that it looks and acts as an emulsion, and further it is very important that during the mixing no air becomes entrapped in the final composition. Thus it has been found that it is advantageous to evacutate the mixture during or after each of the ingredients are mixed therein. Because of the importance of filling all the pores in the final product with wax it is important that no air bubbles or vapor spaces which could form pores remain in the product, and thus the necessity for continuously stirring in a vacuum and/or heating to insure that all vaporizable substances which could form pores are removed.

The time for mixing again determines upon the ingredient and how long it takes to obtain the final emulsion, however the mixing and the heating may continue from a fraction of an hour, say about 15 minutes, on up to several hours, and then continue thereafter for curing. The evacuation is generally carried out at about 25 to 30 mm of mercury and may also be carried out while the product is being heated in an oven say to about to 100°C, which is about the maximum temperature employed and which temperature will melt any of the waxes which are to be used in the composition.

During the last of the mixing stages, a catalyst is usually added for vulcanization or cross-linking polymerization of the final product, which catalyst is added usually while the mixture is still hot, however the heating is discontinued and it is immediately molded before the product cures. The product is put into its molded or final shape when it is in this emulsified state, such as a mayonnaise, and then is left to cool and set-up, which can be from 1 to 10 or more hours depending upon the temperature and the composition of the ingredients. It is recommended that the vulcanization and/or cross polymerization of the product not be carried out too rapidly because of shrinking, in that the faster the vulcanization the more the shrinkage of the silicone ingredients and the formation of voids. If a fluorosilicone co-polymer is employed, the catalyst and the wax need to be milled into it and the final molding thereof requires compression of injection molding because this product is more like a taffy than a mayonnaise, and when the catalyst is added it must be molded immediately.

If a sheet of heat vulcanized silicone is employed, it may be immersed in a melted wax for half hour or more for direct impregnation of the wax into the pores of the final product. This impregnation can also be carried out in a vacuum.

III - PROPERTIES AND USES

The fluorosilicone wax composition of this invention, because of its high impermeability to fluid as well as to ion transfer, plus the fact that it is highly inert and does not react readily to chemicals or is deteriorated by them, enables this product to be extremely valuable as an encapsulation material for electronic and electrical devices implanted into the body as well as a general insulation for electrical equipment and electrical cables to be buried in the ground. Futhermore, this particular composition also can be used as a substitute duct material in the body, because of its ability to reduce the build-up of mineral deposits thereon. If beeswax is used as one of the wax ingredients of the composition, the propolis therein reduces infections.

The product thus can be formed into thin membranes or used in thick solid layers that may vary in thickness from about 10 microns to a few centimeters or more as may be required. Furthermore it maintains its electrical insulation qualities even when placed in an electrically conductive environment for long periods of time and also is flexible so it may be used in coating wire conductors or used as tubes which require flexibility.

OBJECTS AND ADVANTAGES

Accordingly in view of the foregoing, it is an object of this invention to produce a flexible, moldable, durable, tough, efficient, effective, economic and simple liquid, fluid, and ion impermeable electrical dielectric silicone composition which can be used not only as a barrier in a human body and for insulating electronic components such as semi-conductors, but also as an insulator in the ground or as a container for hostile ion containing liquids or fluids and still remain impermeable to these ions and fluids for long periods of time.

Another object is to produce such a composition which is compatible with body tissue, reduces adhesion and build up of mineral deposits around it, is thromboresistant, is inert to body fluids, and can be easily sterilized at boiling temperatures of water without deterioration.

Another object is to produce a composition which has a negative ionic character or is electronegative, has excellent dielectric properties, i.e. at least 1000 megohms resistance, and is substantially inert to chemicals.

Another object is to produce material for encapsulating heart pacers and other electronic sensing equipment for implantation in-vivo organisms and bodies.

A further object is to produce a light weight fluid and ion impermeable plastic composition comprising a cross linked polymer of silicone impregnated with a fluorocarbon and a wax.

BRIEF DESCRIPTION OF THE VIEWS

The above mentioned and other features, objects, and advantages, and a manner of obtaining them are described more specifically below by reference to embodiments of this invention, the results of tests of which are shown in the accompanying drawings wherein:

FIG. I is a graph showing the electrical resistance of membranes of different compositions including those according to the present invention, immersed in a 1 percent salt solution for periods of up to 28 hours; and FIG. II is a schematic wiring diagram of a testing circuit and apparatus for determining the curves in the graph of FIG. I.

DETAILED DESCRIPTION OF PREFERRED EMBODIMENTS

Example 1

A piezoelectric ceramic sensor, for example, Bimorth PZT - 5H of Celvite Corporation, similar to that employed in a heart pacer as described in applicant's above identified U.S. Pat. No. 3,659,615, was prepared comprising a sandwich of two thin piezoelectric ceramic wafers plated with a conductive metal, such as silver or nickel on each of their flat surfaces but not around their edges, which wafers were cemented by an electrically conductive epoxy to each side of a brass foil or plate of the same size as the surface of the wafers to produce a piezoelectric sensor. The outer metallic coated surfaces of this sandwich were then connected to leads 20 and 21 as shown in FIG. II, such as by soldering thereto, and the whole sandwich was then surrounded with a silicone composition according to this invention.

This silicone composition comprising 70% silicone, 20% tetrafluoroethylene and 10% beeswax by weight was prepared as follows: 10 grams of liquid silicone, namely GE No. RTV 615, (Room temperature vulcanizable) were weighed and placed in a beaker, and to this was added 2 grams of polytetrafluoroethylene powder and the mixture was thoroughly stirred for several minutes until the powder was completely dispersed into liquid silicone. The sample was then heated in a oven to about 110° C for about an hour to drive out any moisture and air bubbles that might have been stirred into the mixture, and then it was evacuated in the oven to 25 millimeters of mercury for additional half hour with the oven turned off. To this degasified and dehumidified mixture was then added 1 gram of solid beeswax which melted at this temperature and was easily mixed with the hot silicone tetrafluoroethylene suspension which was at a temperature now of about 70° to 75° C, just about 5° above the melting point of the beeswax. After the melted beeswax was thoroughly mixed with the silicone suspension, the mixture was evacuated again while being maintained above the melting temperature of the wax and stirred thoroughly and evacuated a third time. Now the catalyst was added to the hot mixture to vulcanize or cross-link polymerize the silicone, which catalyst was thoroughly mixed therein and the mixture was again evacuated so that any bubbles that might have been stirred therein during the mixing would be eliminated. The final resulting mixture with the catalyst was now about the consistency of mayonnoise, being a heavy emulsion, and was poured into a mold having an internal cavity about four times the thickness of the piezoelectric sensor. The piezoelectric sensor was suspended in the mold and the encapulant was then poured into the cavity to completely surround the sensor. Before curing, the mold was again evacuated to remove entrapped air. The mold was then heated to a temperature of 70° to 100° C for a period of 25 to 21 hours for curing, depending on the particular composition.

In order to test the permeability or impermeability of this silicone composition, the whole encapsulated sensor was placed in a beaker of 1% NaCe in water solution as shown in FIG. II, and a DC power supply of 9 volts was connected to the lead 41, while the other lead 40 was connected to the other lead of the power supply through a very sensitive electrometer which was sensitive to $10^{-13}$ amperes. As soon as the encapsulated sensor is placed into the solution, readings are taken about every minute because the variation in the conductivity of the piezoelectric wafers increases rapidly at first and then levels off after a couple of hours, when readings can be taken every fifteen minutes and later every hour.

This particular composition sample produced curve 10 shown in FIG. I and had the most impermeability to the penetration of ions, with even an improvement in the impermeability after about 16 to 18 hours to settle at an ohm resistance of 60 kilomegohms of 6 times $10^{10}$ ohms. This shows that this particular silicone composition emersed in an aqueous solution similar in ionization and salt percentage to that of body fluids has an extremely high resistance to permeability of either the solution or the transfer of ions through it, that otherwise would cause a change in the electrical conductivity between the outer coated surfaces of the piezoelectric sandwich.

For purposes of comparison a silicone encapsulation comprising 90% by weight of the same silicone as above together with 10% by weight beeswax and no tetrafluoroethylene was prepared and tested in the same manner and curve 11 in FIG. I was obtained showing a conductivity of about sixty times greater than that of the composition which also contained the tetrafluoroethylene.

Then again for comparative purposes, a silicone encapsulation comprising 80% by weight of the same silicone as above together with 20% by weight of tetrafluoroethylene and no wax was prepared and tested in the same manner, and curve 12 in FIG. I was obtained showing a conductivity of about 20 times greater than that of the composition which also contained the beeswax. Thus, these comparative tests show that tetrafluoroethylene as a solid filler in the silicone, which ordinarily would increase the porosity and conductivity of such a silicone composition with beeswax had exactly the opposite effect, and decreased the conductivity or improved the resistivity of the silicone many times more than would be expected.

As a control, the silicone rubber alone without any wax and without any fluorocarbon was molded and tested, and curve 13 was obtained in FIG. I, showing silicone alone to be much more conductive by an amount twelve hundred times, or that much more permeable, than the silicone composition shown in curve 10 in FIG. I.

Example 2

Using a piezoelectric sensor similar to that described in Example 1 above having an encapsulated silicone composition produced in a similar manner to that for Example 1 but having a composition of 80% silicone, 20% tetrafluoroethylene and 10% of micro-crystaline wax by weight was also tested according to the circuit shown in FIG. II and curve 20 was obtained in FIG. I. This composition showed an improvement of about 30 times over that of just 10% beeswax alone without a fluorocarbon as disclosed in applicant's above mentioned patent, and only half as impermeable as that of the beeswax with the tetrafluoroethylene shown in curve 10. For comparison purposes, a silicone encapsulation comprising 90% by weight of the same silicone as above together with 10% by weight of microcrystaline wax and no tetrafluoroethylene was prepared and tested in the same manner, and curve 21 in FIG. I was obtained showing conductivity of about forty times greater than that of the composition which also contained tetrafluoroethylene, and four times greater than curve 12 for the same amount of tetrafluoroethylene in silicone without any wax.

Example 3

A silicone composition with 10% polyethylene as a synthetic wax and 20% of polytetrafluoroethylene by weight was prepared and tested as described in Example 1 above and found to produce curve 30 in FIG. I. For comparison a similar silicone composition without the 20% polytetrafluoroethylene but just the 10% polyethylene was prepared and identically tested to produce curve 31 in FIG. I to show that the fluorocarbon doubles the impermeability or ion resistance of this synthetic wax containing silicone.

There is described above the principles of this invention in connection with specific examples and compositions, but it is to be clearly understood that this description is made only by way of example and not as a limitation to the scope of this invention.

I claim:

1. A plastic composition substantially impermeable to electrolytes comprising:
   A. between about 50% and 95% by weight of a silicone polymer,
   B. between about 1% and 40% by weight of a fluorocarbon polymer and
   C. between about 0.1% and 25% by weight of a wax.
2. A composition according to claim 1 including a filler comprising a powdered silicon material suspended in said silicone polymer.
3. An electrical insulator impermeable to fluids and ion transfer having the composition according to claim 1.
4. A composition according to claim 1 including about 10% of said wax.
5. A composition according to claim 1 wherein said silicone polymer is a cross-linked dimethyl-siloxane.
6. A composition according to claim 1 wherein said fluorocarbon polymer comprises polytetrafluoroethylene particles dispersed in said silicone polymer.
7. A composition according to claim 1 wherein said fluorocarbon polymer and silicone polymer comprise a co-polymer.
8. A composition according to claim 1 wherein said wax comprises a natural wax.
9. A composition according to claim 8 wherein said wax comprises a beeswax.
10. A composition according to claim 1 wherein said wax comprises a micro-crystaline paraffin wax.
11. A composition according to claim 1 wherein said wax comprises a synthetic wax.
12. A composition according to claim 11 wherein said wax comprises polyethylene.
13. A composition according to claim 1 containing between about 65% and 95% by weight silicone polymer.
14. A composition according to claim 1 containing between about 70% and 90% by weight of silicone polymer.
15. A composition according to claim 1 containing between about 60% and 80% by weight of silicone polymer.
16. A composition according to claim 1 containing between about 65% and 75% by weight of silicone polymer.
17. A composition according to claim 1 including less than about 10% by weight of inert filler.
18. A composition according to claim 17 wherein said filler comprises less than micron sized particles of a siliceous material.
19. A composition according to claim 17 wherein said filler comprises less than micron sized particles of an inert metallic oxide.
20. A composition according to claim 1 including particles ranging from 0.5 to 50 microns in size of a fluorocarbon polymer.
21. A composition according to claim 20 wherein the particles are preferably less than about 20 microns in size.
22. A composition according to claim 1 wherein said fluorocarbon polymer comprises between about 5% and 25% by weight of said composition.
23. A composition according to claim 1 wherein said fluorocarbon polymer is polytetrafluoroethylene.
24. A composition according to claim 1 wherein the percentage of wax is between about 1% and 20% by weight.
25. A composition according to claim 1 when the percentage of wax is between about 5% and 15% by weight.
26. A composition according to claim 1 containing about 20% of said fluorocarbon polymer and about 10% of said wax by weight.
27. An in-vivo implantable flexible composition according to claim 1.
28. A composition according to claim 1 wherein said wax comprises a mixture of two or more waxes.

* * * * *

UNITED STATES PATENT OFFICE
CERTIFICATE OF CORRECTION

Patent No. 3,963,677    Dated    June 15, 1976

Inventor(s)  Carl C. ENGER

It is certified that error appears in the above-identified patent and that said Letters Patent are hereby corrected as shown below:

| | |
|---|---|
| Column 3, line 21 | "therin" should be - - therein - - |
| Column 3, line 22 | after "looks" insert - - like - - |
| Column 3, line 26 | "evacutate" should be - - evacuate - - |
| Column 5, line 55 | "noise" should be - - naise - - |
| Column 5, line 67 | "NaCe" should be - - NaCl - - |
| Column 6, line 15 | "of" should be - - or - - |

Signed and Sealed this

Twenty-sixth Day of October 1976

[SEAL]

Attest:

RUTH C. MASON
*Attesting Officer*

C. MARSHALL DANN
*Commissioner of Patents and Trademarks*